United States Patent [19]

Bearden, Jr. et al.

[11] 4,295,996

[45] Oct. 20, 1981

[54] CATALYSTS FOR HYDROCARBON TREATING PROCESSES

[75] Inventors: Roby Bearden, Jr.; Clyde L. Aldridge; Lloyd A. Pine, all of Baton Rouge, La.

[73] Assignee: Exxon Research & Engineering Co., Florham Park, N.J.

[21] Appl. No.: 93,698

[22] Filed: Nov. 13, 1979

[51] Int. Cl.³ .................... B01J 23/74; B01J 27/04; B01J 31/12
[52] U.S. Cl. ....................... 252/431 C; 252/431 N; 252/431 P; 252/439; 252/463; 252/464; 252/465; 252/466 J; 252/466 PT
[58] Field of Search .......... 252/431 C, 431 N, 431 P, 252/439, 463, 464, 465, 466 J, 466 PT

[56] References Cited

U.S. PATENT DOCUMENTS

| | | | |
|---|---|---|---|
| 1,876,270 | 9/1932 | Zorn | 252/431 R |
| 2,091,831 | 8/1937 | Pongratz et al. | 208/108 |
| 3,052,739 | 9/1962 | Hummers | 585/420 X |
| 3,131,142 | 4/1964 | Mills | 208/108 |
| 3,161,585 | 12/1964 | Gleim et al. | 208/264 |
| 3,657,111 | 4/1972 | Gleim | 208/215 X |
| 4,125,455 | 11/1978 | Herbstman | 208/215 X |
| 4,134,825 | 1/1979 | Bearden et al. | 208/108 |

Primary Examiner—W. J. Shine
Attorney, Agent, or Firm—Marthe L. Gibbons

[57] ABSTRACT

A catalyst is provided which comprises a composition comprising a catalytic metal component, carbon and hydrogen deposited on a low surface area aluminum alloy powder support prepared by atomizing the metal alloy. Hydrocarbon treating and conversion processes utilizing the catalyst are also provided. The catalyst is particularly suitable for slurry processes.

21 Claims, No Drawings ic Table of Elements.

CATALYSTS FOR HYDROCARBON TREATING PROCESSES

BACKGROUND OF THE INVENTION

1. Field of the Invention

This invention relates to a catalyst, a method of preparing the catalyst and its use in hydrocarbon treating and conversion processes.

2. Description of the Prior Art

Catalysts prepared in situ in a hydrocarbonaceous oil from an oil soluble metal compound and their use in hydroconversion processes are disclosed in U.S. Pat. No. 4,134,825.

It is also known to convert simultaneously a mixture of a hydrocarbonaceous oil and coal in the presence of hydrogen and a catalyst. See, for example, U.S. Pat. No. 4,054,504.

Alloy-skeleton metal sulfide hydrogenation catalysts that are corrosion resistant are known. See, U.S. Pat. No. 2,402,626.

Other alloy catalysts are also known. See, for example, U.S. Pat. No. 3,519,575; 3,052,739; 3,962,139; 3,147,154 and 3,455,845.

A highly dispersed alloy material of high surface area and their sulfides useful as hydrocracking catalysts are known. See, U.S. Pat. No. 3,639,647.

Ferromagnetic catalyst supports are known. See Ind. Eng. Chem. Process, Vol. 15, No. 1, 1976, pp. 226–227.

In slurry hydroconversion processes, catalyst recovery from the hydroconverted products is difficult. The use of a high density metal or metal alloy as catalyst support would improve recovery of the catalyst due to the high density of the material and/or its magnetic properties.

Except for catalytic metals and metal compounds that were used unsupported, it was generally considered desirable to composite catalytic metal compounds with a high surface area support for use as catalysts. In contrast, the catalysts of the present invention comprise a catalytic metal-carbon-hydrogen composition deposited on a low surface area support which provides a means for catalyst dispersion and facilitates catalyst recovery. The metal-containing deposite or coating provides the high surface area or "extended" catalyst surface for the desired catalytic reactions.

SUMMARY OF THE INVENTION

In accordance with the invention, there is provided a catalyst comprising a composition comprising a metal component, carbon and hydrogen deposited on a support, the metal constituent of said metal component being selected from the group consisting of metals of Groups II, III, IV, V, VIB, VIIB, VIII and mixtures thereof of the Periodic Table of Elements, said composition having a surface area of at least about 50 m²/g and said support being an aluminum alloy powder having a surface area of less than about 5 square meters per gram prepared by atomizing said aluminum alloy, in molten state, into a stream selected from the group consisting of water, a gas, and mixtures thereof.

Furthermore, in accordance with the invention, there is also provided a method of preparing the catalyst and its use in hydrocarbon treating and conversion processes.

DETAILED DESCRIPTION OF THE INVENTION

The Catalyst

The catalyst of the present invention comprises a composition comprising a catalytically active metal component, carbon and hydrogen deposited on a support which is an aluminum alloy powder. Suitable supports are aluminum alloy powders that are prepared by atomizing the molten (liquid) aluminum alloy into a stream which can be water, a gas, or mixtures thereof. For example, the gas may be hydrogen, argon, helium, nitrogen, steam, air, carbon dioxide, etc. The molten alloy first may be atomized into an inert gas followed by steam treating or air-stream treatment. The formation of metal or metal alloy powders by atomization is well known in the art. See, for example, the book by W. D. Jones, *Fundamental Principles of Powder Metallurgy*, London: Edward Arnold Publishers, 1960, pages 213–238. The alloy powder suitable as support of the catalyst of the present invention, when taken alone prior to being composited with the deposit or coating comprises particles ranging in size from about 0.5 to 150 microns in diameter. The atomized aluminum alloy powder comprises at least one additional metal component other than aluminum selected from the group consisting of metal components of Groups IB, II, III, IV, VB, VIB, VIIB, VIII and mixtures thereof of the Periodic Table of Elements.

Preferably, the additional metal component is selected from the group consisting of iron, cobalt, nickel, chromium, molybdenum, tungsten, vanadium, zinc, tantalum, copper, and zirconium. More preferably the additional metal component comprises iron. More preferably, the alloy powder is a ferroaluminum alloy powder.

The aluminum is suitably present in the aluminum alloy powder in an amount ranging from about 1 to about 59 weight percent, preferably from about 2.0 to about 33 weight percent, more preferably from about 8 to about 20 weight percent. Bound oxygen may be present in the aluminum alloy in an amount ranging from about 0.001 to 2.0 weight percent, preferably, from about 0.01 to 1.5 weight percent, most preferably from about 0.1 to 1.0 weight percent. A preferred alloy comprises from about 10 to about 15 weight percent aluminum; from about 84 to about 89.9 weight percent iron and from about 0.1 to about 1.0 weight percent oxygen.

The atomized aluminum alloy powder used as support of the catalyst of the present invention has a low surface area and low pore volume, that is, a surface area of less than about 5 square meters per gram, preferably less than about 1 square meter per gram, more preferably less than about 0.5 square meter per gram and a pore volume of less than about 0.1 cubic centimeter per gram.

The surface area referred to herein is in accordance with the method of Brunauer, Emmet and Teller (BET), *J. American Chem. Soc.*, Vol. 60 (1938), pp. 309–319.

The pore volume referred to herein is measured by nitrogen adsorption isotherm as described in *Analytical Chemistry*, Vol. 32, April, 1960, pp. 532–536.

The Periodic Table of Elements referred to herein is given in *Handbook of Chemistry and Physics* published by Chemical Rubber Publishing Co., Cleveland, Ohio, 45th Edition (1964).

The atomized aluminum alloy powders used as support in the present invention, which have either paramagnetic or ferromagnetic properties, which facilitate recovery of the catalyst by magnetic separation processes, are preferred.

The atomized aluminum alloy powder supports of the present invention are highly resistant to corrosion by hydrogen sulfide even under very severe conditions.

Suitable metal components of the composition that is deposited on the support are catalytically active components of metals of Groups, II, III, IV, V, VIB, VIIB, VIII and mixtures thereof. Preferably the metal component is a component of vanadium, tungsten, molybdenum, nickel, cobalt, iron and mixtures thereof.

Suitable concentration of the metal component on the support includes from about 0.01 to about 10.0 weight percent, preferably from about 0.1 to about 5 weight percent, most preferably from about 0.5 to about 2.0 weight percent, calculated as the elemental metal, based on the total catalyst.

The high surface area supported catalysts of the present invention are made by utilizing a hydrocarbonaceous oil boiling at atmospheric pressure above about 221° C., preferably above about 260° C., more preferably above about 343° C. These hydrocarbon oils may be derived from any source such as petroleum, oil shale, tar sands and oils derived from coal liquefaction processes. The Conradson carbon residue of these oils will generally range up to about 50 weight percent, preferably below about 30 weight percent (as to Conradson carbon residue, see ASTM Test D 189-65).

By way of example, suitable hydrocarbon oils for the process of the present invention include virgin gas oil, vacuum gas oil, coker gas oil, visbreaker gas oil, petroleum distillates, white oils, hydrocarbon oils derived from coal liquefaction processes, coal liquefaction bottoms, synthetic polymer oils such as ethylene oligomers, synthetic and natural waxes, etc. Preferably, the oil is a mixture of hydrocarbons boiling at atmospheric pressure, in the range of about 343° to 565° C. More preferably, the hydrocarbon chargestock comprises at least 50 percent of the Conradson carbon in the form of a hydrocarbon stream comprising more than 1 weight percent Conradson carbon residue, such as residua, whole crudes, etc.

To the hydrocarbon oil are added the support of the present invention and a thermally decomposable metal compound, wherein the metal constituent is selected from the group consisting of Groups II, III, IV, V, VIB, VIIB, VIII and mixtures thereof of the Periodic Table of Elements. A sufficient amount of a single thermally decomposable metal compound or of a mixture of metal compounds is added to the oil to provide a ratio of atoms of Conradson carbon of the oil chargestock to atom of metal constituent of the thermally decomposable compound or compounds of less than about 750 to 1, preferably less than about 600 to 1, more preferably less than 100 to 1. Suitable ranges of ratio of atoms of Conradson carbon of the oil to atom of metal constituent of the thermally decomposable metal compound include an atomic ratio ranging from about 2 to 1 to about 600 to 1, preferably from about 2 to 1 to about 300 to 1, more preferably from about 4 to 1 to about 100 to 1. Thus, the amount of thermally decomposable metal compound added will vary depending on the Conradson carbon of the oil feed actually used so as to provide the ratio required to obtain high surface area catalytic solids.

By the expression "ratio of atoms of Conradson carbon of the oil chargestock to atom of metal constituent" is intended herein the following relation:

$$\frac{\frac{\text{weight of Conradson carbon residue}}{12}}{\frac{\text{weight of the metal constituent of the thermally decomposable compound}}{\text{atomic weight of the metal}}}$$

Suitable thermally decomposable metal compounds convertible (under preparation conditions) to solid, high surface area deposit include (1) inorganic metal compounds such as carbonyls, halides, oxyhalides; polyacids such as isopolyacids and heteropolyacids (e.g., phosphomolybdic acid, and molybdosilicic acid); (2) metal salts of organic acids such as acyclic and alicyclic aliphatic carboxylic acids and thiocarboxylic acids containing two or more carbon atoms (e.g., naphthenic acids); aromatic carboxylic acids (toluic acid); sulfonic acids (e.g., toluenesulfonic acid); sulfinic acid; mercaptans; xanthic acids; phenols, di- and polyhydroxy aromatic compounds; (3) organometallic compounds such as metal chelates, e.g., with 1,3-diketones, ethylenediamine, ethylenediaminetetraacetic acid, phthalocyanines, etc.; (4) metal salts of organic amines such as aliphatic amines, aromatic amines and quaternary ammonium compounds.

The metal constituent of the thermally decomposable metal compound that is convertible to a solid, high surface area deposit is selected from the group consisting of Groups II, III, IV, V, VIB, VIIB, VIII and mixtures thereof of the Periodic Table of Elements, that is, zinc, antimony, bismuth, titanium, cerium, vanadium, niobium, tantalum, chromium, molybdenum, tungsten, manganese, rhenium, iron, cobalt, nickel and the noble metals including platinum, iridium, palladium, osmium, ruthenium and rhodium. The preferred metal constituent of the thermally decomposable compound is selected from the group consisting of molybdenum, tungsten, vanadium, chromium, cobalt, titanium, iron, nickel and mixtures thereof. Preferred compounds of the given metals include the salts of acyclic (straight or branched chain) aliphatic carboxylic acids, salts of alicyclic aliphatic carboxylic acids, heteropolyacids, carbonyls, phenolates and organoamine salts.

When the thermally decomposable metal compound is added to the hydrocarbonaceous oil, it first dissolves or disperses in the oil and subsequently, under catalyst preparation conditions herein described, is converted to a solid high surface area catalyst.

The oil comprising the thermally decomposable metal compound is heated at a temperature ranging from about 199° C. to about 571° C., preferably at a temperature ranging from about 260° C. to about 482° C., more preferably at a temperature ranging from about 316° C. to about 449° C., at a pressure of either atmospheric or superatmospheric, preferably at superatmospheric pressure in the presence of a gas selected from the group consisting of a hydrogen-containing gas, a hydrogen sulfide-containing gas, and a gas comprising hydrogen and hydrogen sulfide, preferably at least 50 psig of such gas. More preferably, the gas comprises hydrogen and hydrogen sulfide. The hydrogen sulfide may comprise from about 1 to about 90 percent, more preferably from about 2 to 50 mole percent of the hydrogen-containing gas. Suitable total pressures in the catalyst preparation zone when the heating step is being conducted include a pressure ranging up to about 5000 psig, preferably a pressure ranging from about 100 to about 3000 psig. Suitable reaction times include from about 5 minutes to about 4 hours, preferably from about 10 minutes to 2 hours. Contact of the solution under catalyst preparation conditions in the reaction zone with the hydrogen sulfide containing gas converts the metal compound to the corresponding metal catalyst. The oil containing the solids is removed from the catalyst preparation zone. The solids may be separated from the oil by conventional means, for example, by settling or centrifuging or filtration of the slurry. The recovered solids are the high surface area supported catalysts of the present invention. The surface area of the coating or deposit on these catalysts will be at least about 50 $m^2/g$ and range from about 60 to about 600 $m^2/g$, usually from about 100 to about 500 $m^2/g$. The total measured surface area of the supported catalyst, (that is, deposit plus support) will be at least about 0.5 $m^2/g$, and range from about 0.5 to about 60 $m^2/g$, usually from about 1.0 to 30 $m^2/g$. Generally, the high surface area supported catalysts of the present invention comprise at least 0.01 to 10 weight percent, preferably above about 0.1 to 5 weight percent, more preferably from about 0.5 to about 2 weight percent of the metal constituent, calculated as elemental metal, corresponding to the metal constituent of the added thermally decomposable metal compound, said weight being based on the total high surface area catalyst. The catalyst of the present invention may be prepared either in a batch process or in a continuous type operation.

Alternatively, the high surface area composition comprising the metal-carbon-hydrogen may be preformed by utilizing the above-given thermally decomposable compounds, hydrocarbonaceous feed and preparation conditions except the omission of the low surface area support. The low surface area support is subsequently added to hydrocarbonaceous oil comprising the preferred high surface area composition or the preformed metal-carbon-hydrogen-containing composition is subsequently mixed with a hydrocarbonaceous oil of the same type as the oil suitable for the formation of the high surface area composition and with the low surface area support of the present invention. The mixture is heated at the same temperature and conditions used in the formation of the metal-carbon-hydrogen composition in the presence of a hydrogen-containing gas which may additionally comprise hydrogen sulfide for a time sufficient to deposit the metal-carbon-hydrogen composition on the low surface area support and thereby form a high surface area supported catalyst of the present invention.

The solids that are recovered from the reaction product of the catalyst preparation zone are suitable as catalysts, catalyst components or catalyst supports for use in a number of chemical processes and hydrocarbon treating and conversion processes such as catalytic cracking, hydrogenation, hydrogen refining, hydrodesulfurization, hydrocracking, reforming, etc., especially for hydroprocesses. The term "hydroprocess" is intended herein to mean a process conducted in the presence of hydrogen in which the hydrocarbonaceous oil feed is either upgraded (refined) without substantial change in the boiling range of the oil or a process in which the hydrocarbonaceous oil is converted to lower boiling hydrocarbon products.

The metal-carbon-hydrogen-coated support may be produced ex situ and added as a preformed metal component-carbon-hydrogen-coated support to the chargestock to be treated or the desired metal compound may be added to the hydrocarbonaceous oil chargestock containing the support and the decomposition of the metal compound may be made to occur in situ in the oil chargestock by heating the oil comprising the support and the metal compound to an elevated temperature while adding a hydrogen-containing gas or a hydrogen and hydrogen sulfide-containing gas to the mixture.

The catalyst of the present invention may be used in a slurry process, in a fluidized bed process, in a fixed bed process, in a moving bed process, in an ebullating bed process, etc.

It is particularly suited for use in slurry processes since recovery of the catalyst could be performed by gravity separation, magnetic filtration or a combination of both of these methods.

The particle size of the catalyst may suitably range from about 0.5 micron to about 150 microns in diameter, preferably from about 1 to about 50 microns, most preferably from about 1 to about 10 microns in diameter. The smaller particle sizes will be preferred for slurry type processes whereas particle sizes above 100 microns in diameter would be suitable for fluidized bed type processes.

The catalysts of the present invention are suitable for use in hydrocarbon treating processes. The catalysts are particularly suited for hydroconversion of hydrocarbonaceous oils and coal.

The operating conditions to be employed in the hydrocarbon treating processes are well known and will vary with the particular reaction desired. Table I summarizes typical reaction conditions in which the catalysts of the present invention can be utilized.

TABLE I

| Principal Reaction Desired | Temperature, °C. | Pressure, psig | Feed Rate V/V/Hr | Hydrogen Rate SCF/bbl |
|---|---|---|---|---|
| Hydrorefining | 260–427 | 50–2000 | 0.1–10 | 500–10,000 |
| Hydrodesulfurization | 316–455 | 600–3500 | 0.05–5 | 300–20,000 |
| Hydrocracking | 232–510 | 200–2000 | 0.1–10 | 500–10,000 |
| Catalytic Cracking | 371–705 | 0–50 | 0.1–20 | 0 |
| Catalytic Reforming | 454–538 | 50–1000 | 0.1–20.0 | 500–10,000 |

The feedstocks suitable for the treating process in accordance with the invention include any of the well known feeds conventionally employed in the desired treating processes. Suitable feedstocks for the hydrocarbon treating processes of the present invention include hydrocarbonaceous oils derived from any source such as petroleum, shale, tar sand, coal liquefaction processes, including coal liquefaction bottoms. Typically, such feeds include naphthas, gas oils, atmospheric residua, vacuum residua, whole petroleum crude oils, including heavy crude oils, bitumen, etc.

To any of these hydrocarbonaceous oils may be added particulate coal when the process utilized is suitable for the simultaneous treatment of oil and coal.

The metal constituent or metal constituents of the coating or deposit of the present invention can be varied by using one or more initial thermally decomposable metal compounds which are subsequently thermally decomposed. Alternatively, the preformed coating of the total catalyst may be composited with other known catalytic components. Thus a recovered high surface area composition of the total catalyst may be composited in a conventional manner with metal constituents that are known to catalyze a given process. The compositing of the catalyst with the additional catalytic agents may be performed by impregnating the preformed high surface area composition or total catalyst comprising one or more metal constituents with catalytic components or precursors in any conventional way, such as contact of the solids with a dissolved salt of the desired metal or metals, or by a method such as disclosed in U.S. Pat. No. 3,959,179.

The compositing of the preformed high surface area composition or total catalyst may be performed by depositing a desired catalytic metal component or precursor of a catalytic metal component on the surface of the solids, including contacting of the solids with vapor phase materials. Furthermore, physical mixture of two or more different preformed high surface area compositions or total catalysts may be used in certain processes, for example, a recovered catalyst having one or more metal constituents which is different from another recovered catalyst wherein different initial thermally decomposable metal compounds were used.

The catalyst of the present invention may be used in a moving bed, fixed bed, fluidized bed, ebullating bed, suspension (transferline) or in slurry processes.

PREFERRED EMBODIMENTS

The following examples are presented to illustrate the invention.

Comparison Test 1—(Based on runs 34-R-69; 34-R-71; 56-R-06; 56-R-08)

The following catalyst is not a catalyst of the present invention. It will be designated herein as "Catalyst A".

A catalyst comprising a molybdenum-carbon-hydrogen composition coated on 410 stainless steel was prepared as follows: A mixture comprising 3.29 g of molybdenum naphthenate (6 weight percent molybdenum), 100.4 g of light Arab vacuum gas oil, and 50.0 g $-325$ mesh (Tyler) 410 stainless steel powder was charged to a 300 cc autoclave, which was pressured with 20 psig hydrogen sulfide and 2000 psig hydrogen at room temperature and then heated with stirring for a period of two hours at 399° C. (750° F.). The given grade of stainless steel (410) is in accordance to the designation of American Iron and Steel Institute (see *Lange's Handbook of Chemistry*, Handbook Publisher, Inc. Sandusky, Ohio, 1952 p. 340). The autoclave was cooled below 93.33° C. (200° F.) and vented while further cooling to room temperature. The autoclave contents were filtered and the recovered solids were thoroughly washed with hot toluene followed by hot n-heptane. After vacuum oven drying for one hour at 90° C., fifty-one grams of catalytic solids were recovered. The resistance of the catalyst (which is not a catalyst of the present invention) to sulfiding or hydrogen sulfide corrosion, was determined by subjecting the catalyst to three consecutive cycles of high severity vacuum gas oil hydrocracking, which were conducted in the following manner. For the initial cycle, a mixture of 91.8 grams of light Arab vacuum gas oil and 50.85 grams of the above prepared catalyst was charged to a 300 ml autoclave, pressured with 100 psig $H_2S$ and 200 $H_2$ at room temperature, and then heated with stirring for 30 minutes at 385° C. (725° F.) followed by 30 to 40 minutes at 449° C. (840° F.). Upon cooling and venting off pressure, the contents of the autoclave was filtered to recover the catalyst solids, which were washed with hot toluene followed by hot heptane, vacuum oven dried at 90° C. for one hour, weighed, and then recharged to the autoclave with fresh vacuum gas oil for the next hydrocracking cycle. After the third hydrocracking cycle, the weight of the dry recovered solids was 60.31 g, which amounts to a weight increase of 18.6 percent, based on the 50.85 g of catalyst charged to the first cycle. The incremental increase in weight per cycle was uniform, which indicated that the corrosion rate (percent weight increase divided by hours of contact) for this catalyst was 11.1 percent per hour. Elemental analysis showed that the catalyst recovered after three hydrocracking cycles contained 0.66 weight percent carbon and 18.84 weight percent sulfur. This shows that the weight increase of the catalyst was largely due to sulfiding of the 410 stainless steel support.

Comparison Test 2—(Based on run 470. Corrosion-characteristics of the comparative catalyst)

The following catalyst is not a catalyst of the present invention. It will be designated herein as "Catalyst B".

A catalyst comprising a molybdenum-carbon-hydrogen composition coated on 410 stainless steel powder was prepared as follows: A mixture comprising 8.0 g of molybdenum naphthenate, 92.0 g of light Arab vacuum gas oil and 50.0 g of $-325$ mesh (Tyler) 410 stainless steel powder was charged to a 300 cc autoclave which was subsequently pressured with 2000 psig hydrogen at room temperature, heated to 316° C. (600° F.) and held for one hour with stirring. The autoclave was cooled below 93.33° C. (200° F.) and vented while further cooling to room temperature. At this point the catalyst preparation step was complete. Note that this catalyst is not a catalyst of the present invention. With the vacuum gas oil and catalyst charge in place, the reactor was pressured with 100 psig $H_2S$ and 2000 psig $H_2$ at room temperature, after which it was heated for two hours at 399° C. (750° F.). After cooling, the autoclave was vented and the contents filtered. The recovered solids were washed with hot toluene followed by hot n-heptane and then vacuum oven dried. The weight of dry solids was 53.28 grams. Adjusting for the weight of the molybdenum sulfide-carbon-hydrogen composition coating, which was 1.44 g, it was calculated that the alloy had gained 1.84 g in weight, or 3.68 weight percent. On an hourly basis, the rate of weight gain was 1.84 weight percent.

EXAMPLE 1—(Based on runs 34-R74; 34-R-75; 56-R-07; 56-R-09; 56-R-10)

The catalyst of this example is in accordance with the present invention. It will be designated herein as "Catalyst C".

A catalyst comprising a molybdenum sulfide-carbon-hydrogen composition coated on a $-325$ mesh (Tyler) water atomized ferroaluminum alloy powder was prepared using the procedure described in Comparison Test 1. The reactor charge comprised 3.68 grams of molybdenum naphthenate, 99.8 g of light Arab vacuum gas oil and 50 g of alloy powder which assayed 90.5 weight percent Fe; 9.1 weight percent Al and 0.4 weight percent oxygen. The gas charge was identical to that used in Comparison Test 1. After completion of the run, fifty-two and eight hundredth grams (52.08 g) of catalyst of the present invention were recovered.

The resistance of the catalyst to sulfiding corrosion was determined according to the procedure used in Comparison Test 1, except that the catalyst was used in four consecutive high severity vacuum gas oil cracking runs instead of three. After the fourth cycle, fifty-two point twenty-eight (52.28 g) grams of dry catalyst were recovered, which amount is only 0.2 g greater in weight than the weight of the catalyst charged to the first hydrocracking cycle. The apparent rate of weight increase (percent increase in weight divided by hours of contact) was 0.16% per hour.

A summary of the hydrocracking results obtained in each cycle is given in Table II.

TABLE II

| Cycle No. | 1 | 2 | 3 | 4 |
|---|---|---|---|---|
| Contact Time, min. | 30 | 40 | 40 | 40 |
| Desulfurization of feed, % | 76 | 78 | 77 | 75 |
| 650+° F. conversion, % | 40 | 47 | 45 | 47 |
| Bromine No. of product | 4.9 | 3.8 | 4.0 | 4.3 |
| Distillate (325–650° F.) to naphtha (65–325° F.) wt. ratio | 3.9 | 4.0 | 4.5 | 4.5 |

As can be seen from Table II the catalyst activity is being maintained during repeated use.

EXAMPLE 2—Corrosion characteristics of ferroaluminum-containing catalysts (based on runs 56-R-22; 56-R-23; 56-R-24 and 56-R-25)

The catalyst of this example is a catalyst in accordance with the present invention. It will be designated herein as "Catalyst D".

Another molybdenum sulfide-carbon-hydrogen composition coated on water atomized ferroaluminum alloy powder was prepared with a high molybdenum content and with a small mesh size relative to Example 1. The reactor charge consisted of a mixture of 50.0 g of −400 mesh (Tyler) water atomized ferroaluminum alloy powder, 9.44 g of molybdenum naphthenate and 100.11 g of light Arab vacuum gas oil. The gas charge to the reactor consisted of 25 psig $H_2S$ and 2000 psig $H_2$ at room temperature. Following the procedure given in Comparison Test 1, fifty-two point twenty-nine (52.29 g) grams of catalyst were recovered. The recovered catalyst is a catalyst in accordance with the present invention.

The resistance to sulfiding corrosion of the catalyst was determined according to the procedure used in Comparison Test 1, except that $H_2S$ was omitted from the gas charge used in the third and final vacuum gas oil hydrocracking cycle.

After the third cycle, fifty-two grams of catalyst were recovered, which was substantially equivalent, considering handling losses, to the 52.29 g of catalyst charged to the first cycle. Therefore, it appears that no detectable sulfiding corrosion occurred.

A summary of the hydrocracking results obtained in each cycle is given in Table III.

TABLE III

| Cycle No. | 1 | 2 | 3[(1)] |
|---|---|---|---|
| Contact Time per cycle, min. | 40 | 40 | 40 |
| Desulfurization of feed, % | 92.8 | 90.0 | 90.0 |
| 650° F. conversion, % | 52.1 | 52.4 | 52.1 |
| Bromine No. of product | 1.5 | 1.5 | 1.4 |
| Distillate (325–650° F.) to naphtha (65–325° F.) wt. ratio | 2.1 | 2.2 | 2.3 |

[(1)]No $H_2S$ added to final cycle

The results given in Table III show that the catalyst of the invention gave good activity and maintained its activity with extended use.

Preparation of a comparative catalyst

Preparation of unsupported high surface area molybdenum-carbon-hydrogen composition (run 37-L)

The following catalyst is not a catalyst of the present invention. This catalyst will be designated herein as "Catalyst E".

A mixture of 17.3 g of molybdenum naphthenate and 371.3 g of light Arab vacuum gas oil was charged to a one liter autoclave with 2000 psig hydrogen at room temperature. The autoclave was heated to 449° C. over a period of 93.8 minutes and held at this temperature for 28 minutes and cooled rapidly. The solids were isolated by filtration, washed with toluene followed by hexane and then vacuum oven dried to give 1.88 g of a material which had a pore volume of 2.1 cc/g and a surface area of 335 $m^2/g$.

Isolation of surface coating from alloy supported catalyst

A sample of the molybdenum sulfide-carbon-hydrogen ferroaluminum alloy catalyst, prepared in accordance with Example 1, was placed in butyl alcohol and subjected to ultrasonic treatment to separate the surface coating from the alloy. A subsequent comparison of electron micrograph of the coating with that of Catalyst E showed that the two materials were idential in appearance.

What is claimed is:

1. A catalyst comprising a composition comprising a metal component, carbon and hydrogen deposited on a support, the metal constituent of said metal component of said composition being selected from the group consisting of metals of Groups II, III, IV, V, VIB, VIIB, VIII and mixtures thereof of the Periodic Table of Elements, said composition having a surface area of at least about 50 $m^2/g$ and said support being an aluminum alloy powder having a surface area of less than 5 square meters per gram, said alloy having been prepared by atomizing said aluminum alloy, in molten state, into a stream selected from the group consisting of water, a gas and mixtures thereof, said catalyst having been prepared by the steps which comprise:
   (a) dispersing in a hydrocarbon oil having a Conradson carbon content up to about 50 weight percent,
      (1) a thermally decomposable metal compound in an amount sufficient to provide a ratio of atoms of oil Conradson carbon to atom of metal constituent of said thermally decomposable metal compound of less than about 750 to 1, said metal constituent being selected from the group consisting of Group II, Group III, Group IV, Group V, Group VIB, Group VIIB, and Group VIII of the Periodic Table of Elements and mixtures thereof, and (2) said support;
   (b) heating the resulting mixture in the presence of a gas selected from the group consisting of a hydrogen-containing gas, a hydrogen sulfide-containing gas and a gas comprising hydrogen and hydrogen sulfide, and
   (c) recovering a supported catalyst.

2. The catalyst of claim 1 wherein said stream is water.

3. The catalyst of claim 1 wherein said gas is selected from the group consisting of hydrogen, argon, helium, nitrogen, steam, air, carbon dioxide and mixtures thereof.

4. The catalyst of claim 1 wherein said aluminum alloy powder comprises at leat one additional metal other than aluminum selected from the group consisting of IB, II, III, IV, VB, VIB, VIIB, VIII and mixtures thereof of the Periodic Table of Elements.

5. The catalyst of claim 1 wherein said aluminum alloy powder is a ferroaluminum alloy powder.

6. The catalyst of claim 1 or claim 5 wherein said aluminum alloy powder comprises from about 1 to about 59 weight percent aluminum.

7. The catalyst of claim 1 wherein said support is ferromagnetic.

8. The catalyst of claim 1 wherein said metal component of said composition, calculated as the elemental metal, comprises from about 0.01 to about 10 weight percent of said catalyst.

9. The catalyst of claim 1 wherein said metal component of said composition is selected from the group consisting of vanadium component, tungsten component, molybdenum component, nickel component, cobalt component, iron component and mixtures thereof.

10. The catalyst of claim 1 wherein said catalyst has a size ranging from about 0.5 micron to about 150 microns in diameter.

11. A process for the preparation of a supported catalyst which comprises, the steps of:
  (a) dispersing in a hydrocarbon oil having a Conradson content up to about 50 weight percent, (1) a thermally decomposable metal compound in an amount sufficient to provide a ratio of atoms of oil Conradson carbon to atom of metal constituent of said thermally decomposable compound of less than about 750 to 1, said metal constituent being selected from the group consisting of Group II, Group III, Group IV, Group V, Group VIB, Group VIIB, and Group VIII and mixtures thereof of the Periodic Table of Elements, and (2) an aluminum alloy powder support having a surface area of less than about 5 square meters per gram, said alloy support having been prepared by atomizing said aluminum alloy, in molten state, into a stream selected from the group consisting of water, a gas and mixtures thereof;
  (b) heating the resulting mixture in the presence of a gas selected from the group consisting of a hydrogen-containing gas, a hydrogen sulfide-containing gas, a gas comprising hydrogen and hydrogen sulfide, to produce a composition having a surface area of at least about 50 m²/g deposited on said support, and
  (c) recovering a supported catalyst.

12. The process of claim 11 wherein said aluminum alloy powder comprises at least one additional metal other than aluminum selected from the group consisting of Groups, IB, II, III, IV, VB, VIB, VIIB, VIII and mixtures thereof of the Periodic Table of Elements.

13. The process of claim 11 wherein said aluminum alloy powder is a ferroaluminum alloy powder.

14. The process of claim 11 wherein said aluminum alloy powder comprises from about 1 to about 59 weight percent aluminum.

15. The process of claim 11 wherein said thermally decomposable metal compound is selected from the group consisting of inorganic metal compounds, salts of organic acids, organometallic compounds and salts of organic amines.

16. The process of claim 11 wherein said thermally decomposable metal compound is a metal naphthenate.

17. The process of claim 11 wherein said thermally decomposable metal compound is phosphomolybdic acid.

18. The process of claim 11 wherein said metal constituent of said thermally decomposable metal compound is selected from the group consisting of vanadium, tungsten, molybdenum, nickel, cobalt, iron and mixtures thereof.

19. The process of claim 11 wherein said support has a surface area of less than about 1 square meter per gram.

20. The process of claim 11, wherein said heating of step (b) is conducted at a temperature ranging from about 199° C. to about 571° C.

21. A process for the preparation of a supported catalyst which comprises the steps of:
  (a) dispersing in a hydrocarbon oil having a Conradson carbon content up to about 50 weight percent, a thermally decomposable compound in an amount sufficient to provide a ratio of atoms of oil Conradson carbon to atom of metal constituent of said thermally decomposable compounds of less than about 750 to 1, said metal constituent of said thermally decomposable compound being selected from the group consisting of Group II, Group III, Group IV, Group V, Group VIB, Group VIIB, Group VIII and mixtures thereof of the Periodic Table of Elements;
  (b) heating the resulting mixture in the presence of a gas selected from the group consisting of a hydrogen-containing gas, a hydrogen sulfide-containing gas, and a gas comprising hydrogen and hydrogen sulfide, to form a catalytic composition comprising a metal component, carbon and hydrogen;
  (c) contacting the resulting composition with an aluminum alloy powder support having a surface area of less than about 5 square meters per gram, said support having been prepared by atomizing said alloy, in molten state, into a stream selected from the group consisting of water, a gas and mixtures thereof, said contacting being in the presence of a hydrocarbon oil having a Conradson carbon content up to about 50 weight percent;
  (d) heating the resulting mixture in the presence of a gas selected from the group consisting of a hydrogen-containing gas, a hydrogen sulfide-containing gas and a gas comprising hydrogen and hydrogen sulfide, for a time sufficient to deposit said composition on said support, said composition having a surface area of at least about 50 m²/g, and
  (e) recovering a supported catalyst.

* * * * *